Jan. 13, 1953 W. D. LANINGHAM 2,624,996
TOP WIG FOR HORSES
Filed Dec. 5, 1949

INVENTOR.
WILLIAM DAVIS LANINGHAM
BY
ATTORNEY

Patented Jan. 13, 1953

2,624,996

UNITED STATES PATENT OFFICE 2,624,996

TOP WIG FOR HORSES

William Davis Laningham, Austell, Ga.

Application December 5, 1949, Serial No. 131,103

3 Claims. (Cl. 54—78)

This invention relates to a top wig for horses and like animals, and more particularly to an improved frame and device for holding the same onto the animal.

In the showing of fine horses, it is desirable to have the animal present the most pleasing appearance possible, and in this connection effort has been made to improve the appearance of the tail of the animal. It is the accepted custom to employ artificial means for improving the position and appearance of the tail, artificial or extra tails being added to the end of the natural tail or secured with attaching means adjacent the top or highest portion of the tail for obtaining the desired erect position and configuration with the resulting pleasing appearance, without pain or cruelty to the animal and leaving the natural tail in its normal relaxed position during the use of the invention.

Previously, a top wig of this sort has been secured to the natural tail of the animal by means of a support having spaced side members through which the natural tail of the animal was inserted so that the lower portion of the support went underneath or behind the natural tail of the animal. With these prior constructions, difficulty was experienced in retaining the support in its proper relationship to the natural tail of the horse, the action of the gaited horse in motion causing the artificial tail to slip down out of place and thus present a most unpleasing and unsatisfactory appearance.

It is an object of this invention to provide a top wig for horses and the like in which the support is constructed to fit outside and over the natural tail of the animal throughout the entire length of the device.

Another object of this invention is to provide a support for a top wig in which positive means are provided for fastening the support in place.

Another object of this invention is to provide a top wig which attains the desired erect position and blends with the natural tail of the animal in a more thoroughly inconspicuous and pleasing manner.

Another object of this invention is to provide a top wig which is adjustable to achieve the desired appearance on horses of various conformations.

Another object of this invention is to provide a top wig which is pleasing in appearance, economical to manufacture, efficient in use and durable in construction.

Other and further objects and advantages of this invention will be apparent from the following description taken in connection with the accompanying drawings in which like characters of reference designate corresponding parts throughout the several views, and wherein.

Figure 1:
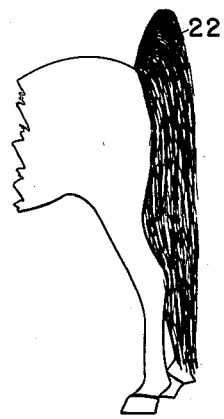
Fig. 1 is a fragmentary side view of a horse showing my top wig in place.

In the embodiment chosen for purpose of illustration, the support is formed from a strip of light sheet material such as aluminum or other metal, or plastic, wood or other suitable material, and has a body portion 10 and a depending skirt 11. The body portion and skirt depending therefrom are formed with a concave inner or front surface and a convex outer or rear surface. This construction gives added rigidity in these portions, and at the same time affords a good fit. A plurality of thongs 12 are threaded through the body portion 10 and the skirt portion 11 for fastening the device to the horse's tail.

Connected to the top of the body portion 10, or formed as an integral extension thereof, is a seat portion 13 which extends forwardly at an angle of approximately 45° from the body portion and then bends through an angle of approximately 90° and extends upwardly and rearwardly at 14 to a top loop portion 15 where it is bent to extend downwardly to form a rear adjusting brace member 16 which lies substantially parallel to the front portion 14. The lower end of the rear adjusting brace member 16 contacts the body member 10 and is adjustably fastened thereto by means of the bolt 17 which passes through a hole in the lower end of the adjusting means 16 and through any one of a plurality of holes 18 provided in the body member 10.

Passing through the body member 10, or otherwise securely attached thereto, is the clamp 19 having depending fingers 20, 20' for passing over a plate 21 which is securely fastened to the hairs of the natural tail of the animal, as by clamping or otherwise, such plates being customarily affixed to serve as positive identification plates on the animals.

Figure 2:
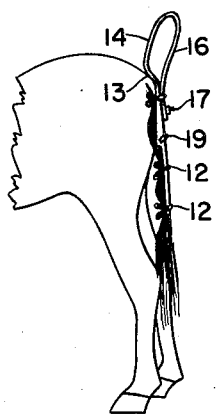
Fig. 2 is a side view, similar to Fig. 1, showing the bare support with covering removed.
Figure 3:
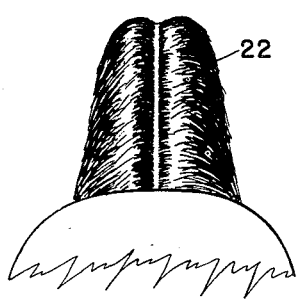
Fig. 3 is a front view of the device shown in Fig. 1.
Figure 4:
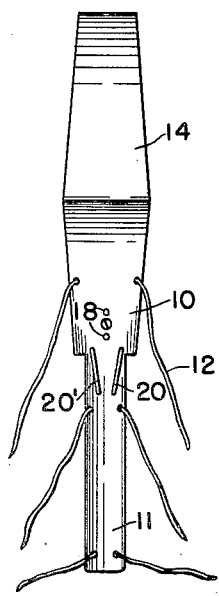
Fig. 4 is a front view of the support with covering removed.
Figure 5:
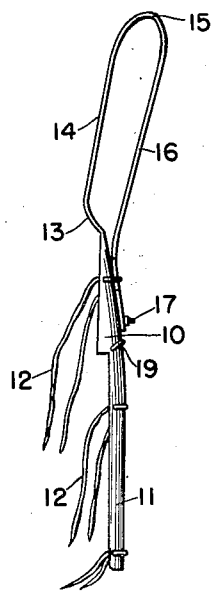
Fig. 5 is a side view of the device shown in Fig. 4.
Figure 6:
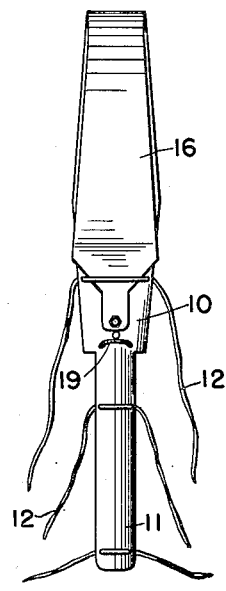
Fig. 6 is a rear view of the device shown in Fig. 4.
Figure 7:
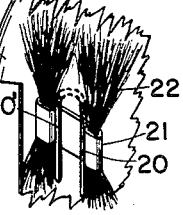
Fig. 7 is a perspective view of a detail showing means for positively retaining the device in proper position on the animal.

In the use of my top wig, the support is placed over the natural tail of the animal so that the concave front surface of the body portion and depending skirt portion surround or partially encompass the tail bone, with the seat portion 13 above the outcropping of the natural tail. With the support in this position, the fingers 20, 20' are inserted between the plate 21 and the hairs of the natural tail, and then the support is pushed downwardly into a fixed position so that the seat portion 13 rests against the animal's rump and adjacent the outcropping of the natural tail hairs. When the fingers 20 have thus been forced into retaining position, the thongs 12 are then securely tied around the natural tail of the animal, as shown in Fig. 2, and there is no chance or possibility of the support slipping from its fixed relation to the natural tail, although any movement of the natural tail by the animal will result in a corresponding movement of the support. If the supplemental hair, or artificial hair covering 22, is then placed over the support in the customary manner, it will blend with the natural tail of the animal and the support will be hidden from view; and with careful matching or blending of the wig with the natural coloring of the animal, a most pleasing effect and a desirable appearance of the desired tail setting will be achieved.

In the upper portions 13, 14, 15 and 16, the strip of sheet material from which the support is made is flat, so that it may be flexed to adjust the tilt of the top wig by the simple expedient of lengthening or shortening the effective length of the brace 16 by placing the bolt 17 in the proper hole 18 which may be chosen to suit the configuration of the particular animal on which the top wig is being used. By this simple means of adjusting the angle of tilt for the top wig, a desirable and pleasing appearance is assured. Also, instead of the rigidity or stiffness added to the lower portions by the concave-convex construction, the flat upper portions have flexibility or "life" which enhances the natural appearance in use.

It will be obvious that my invention provides a needed article of great convenience and usefulness, and that while I have illustrated and described my inveniton in a very practicable embodiment thereof without attempting to illustrate or describe other embodiments or adaptions which I contemplate, various changes, adaptations and improvements may be made without departing from the scope of my invention as defined in the appended claims.

I claim:

1. In a device of the class described, a support having a rigid body portion, a rigid skirt portion depending from said body portion, said body and skirt portions being formed with a concave front surface and a convex rear surface, fastening means on said body and skirt portions for securing the support to the natural tail of an animal, a flexible extension extending forwardly and upwardly from the upper extremity of said body portion to form a seat portion, a flexible wig supporting portion extending angularly upwardly and rearwardly from said seat portion, said wig supporting portion including spaced front and rear members, the lower extremity of said rear member being adjustably secured to said body portion intermediate the length thereof, and means for selectively varying the point of attachment between the lower extremity of said rear member and said body portion to adjust the angular relationship between said wig supporting portion and said body portion.

2. A device as set forth in claim 1 where the lower extremity of said rear member is provided with an aperture and the body portion is provided with a plurality of vertically spaced apertures and a fastening member engaging the aperture in said rear member and being intended for selective engagement with one of the apertures in said body portion to vary the angular relationship between said wig supporting portion and said body portion.

3. In a device of the class described, a support having a rigid body portion and a rigid depending skirt portion, said body and skirt portions being formed with a concave front surface and a convex rear surface, fastening means on said body and skirt portions for securing the support to the natural tail of an animal, a seat portion extending forwardly and upwardly from the upper extremity of the body portion, a wig supporting portion extending angularly upwardly and rearwardly from said seat portion, said wig supporting portion including spaced front and rear members, and means for adjustably securing the lower extremity of said rear member to the body portion intermediate the length thereof for varying the angular relationship between said wig supporting and body portions.

WILLIAM DAVIS LANINGHAM.

REFERENCES CITED

The following references are of record in the file of this patent:

UNITED STATES PATENTS

| Number | Name | Date |
|---|---|---|
| 130,939 | Phillips | Aug. 27, 1872 |
| 640,917 | Jones | Jan. 9, 1900 |
| 770,188 | Rutherford | Sept. 13, 1904 |
| 1,011,292 | Wallace | Dec. 12, 1911 |
| 2,484,766 | Turner | Oct. 11, 1949 |